United States Patent [19]

Abe et al.

[11] Patent Number: 4,949,691
[45] Date of Patent: Aug. 21, 1990

[54] SYSTEM AND METHOD FOR CONTROLLING IGNITION TIMING FOR INTERNAL COMBUSTION ENGINE

[75] Inventors: Toshiro Abe, Tokyo; Atsunori Hashimoto, Kanagawa, both of Japan

[73] Assignee: Nissan Motor Company, Limited, Yokohama, Japan

[21] Appl. No.: 404,282

[22] Filed: Sep. 8, 1989

[30] Foreign Application Priority Data

Sep. 12, 1988 [JP]  Japan .................................. 63-229621

[51] Int. Cl.⁵ .............................................. F02P 5/15
[52] U.S. Cl. ..................................... 123/419; 123/421; 123/422; 123/425
[58] Field of Search ............... 123/418, 419, 421, 422, 123/423, 425

[56] References Cited

U.S. PATENT DOCUMENTS

| | | | |
|---|---|---|---|
| 4,498,438 | 2/1985 | Sato | 123/418 |
| 4,660,535 | 4/1987 | Asano | 123/425 |
| 4,774,922 | 10/1988 | Morita | 123/425 |
| 4,799,469 | 1/1989 | Nagano et al. | 123/418 |
| 4,844,026 | 7/1989 | Tomisawa | 123/419 |
| 4,852,537 | 8/1989 | Nagano et al. | 123/422 |
| 4,887,573 | 12/1989 | Fujiwara et al. | 123/422 |

FOREIGN PATENT DOCUMENTS 1-125566  5/1989  Japan .

*Primary Examiner*—Andrew M. Dolinar
*Attorney, Agent, or Firm*—Foley & Lardner, Schwartz, Jeffery, Schwaab, Mack, Blumenthal & Evans

[57] ABSTRACT

A system and method for controlling ignition timing for a vehicular internal combustion engine in which when the engine is transferred to a transient operating state (accelerated or decelerated), a correction for the basic ignition timing determined according to engine operating conditions is reversed depending on whether the basic ignition timing advance angle exceeds a MBT (Minimum advance for a Best Torque) ignition timing angle such that, on condition that the basic ignition advance angle exceeds the MBT ignition timing angle, the basic ignition timing advance angle is advanced when the engine rotational speed is increased and is retarded when the engine rotational speed is decreased, thus suppressing the generation of shuddering vibrations generated by the engine.

20 Claims, 6 Drawing Sheets

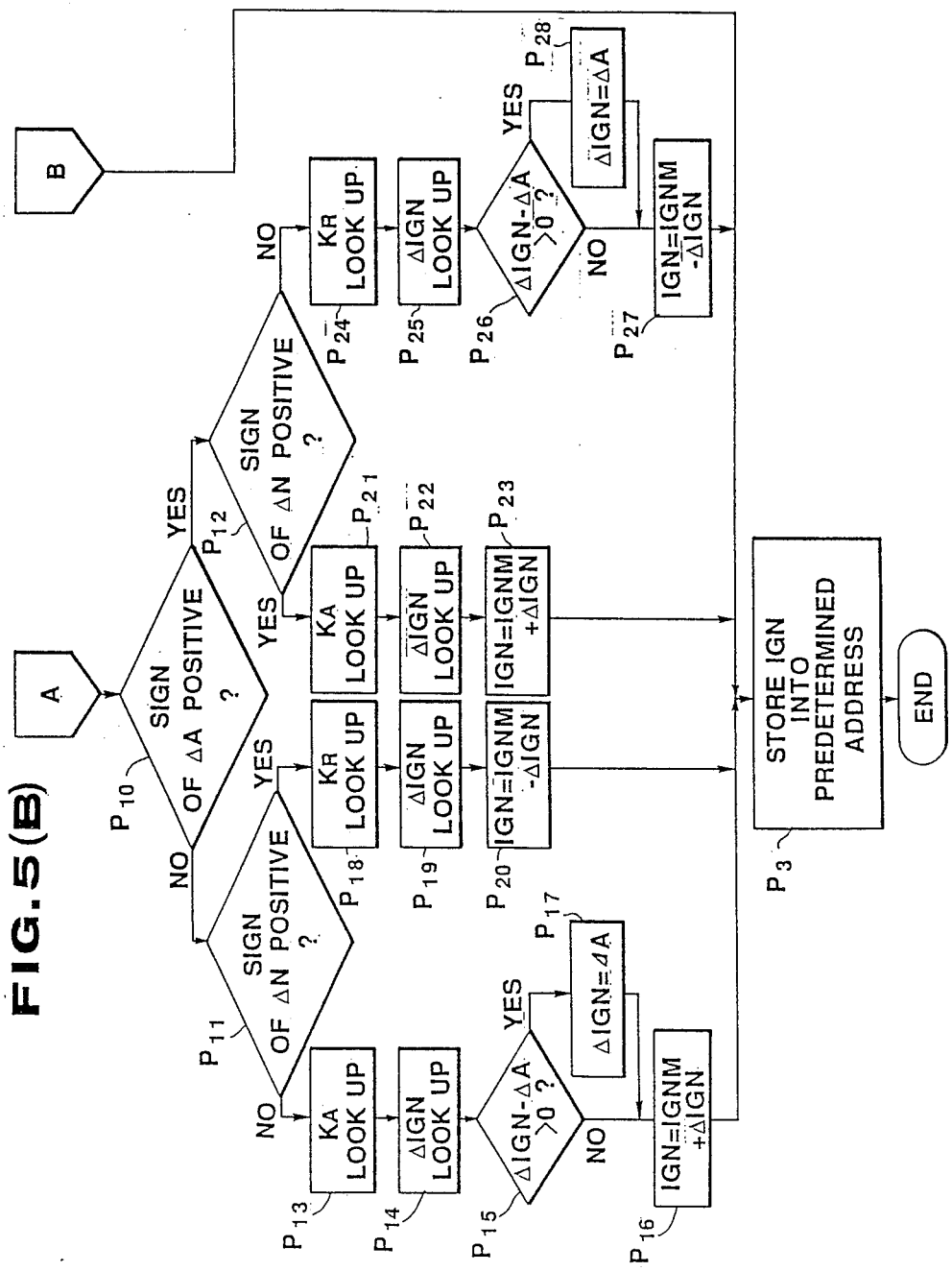

SYSTEM AND METHOD FOR CONTROLLING IGNITION TIMING FOR INTERNAL COMBUSTION ENGINE

BACKGROUND OF THE INVENTION

1. Field of the invention

The present invention relates generally to a system and method for controlling ignition timing for an internal combustion engine applicable to an automotive vehicle and particularly relates to the system and method which reduce vibrations (so-called, shuddering vibrations to be described later) along with rotational vibrations of engines at a time of transient state.

2. Background of the art

Recently, higher performance requirements for vehicle mounted engines are increased so that higher engine driveability, lower fuel consumptions, and higher running characteristics are achieved at higher levels.

Particularly, it is desirable to suppress vibrations of the engine generated due to engine rotational speed variations for the respective cylinders from a driveability standpoint of view.

That is to say, the engine revolutional speed does not smoothly rise under a transient state such as during an acceleration and/or deceleration but involve engine speed variations. Such engine speed variations are transmitted to a drive system of the vehicle in a form of torque variations, thereby generating low-frequency vibrations (hereinafter, referred to as surge) in front and rear directions of the vehicle.

This surge gives the driver an unpleasant feeling of shuddering (so-called shuddering vibrations) so that the engine driveability becomes worsened.

To prevent such shuddering vibrations, an ignition timing controlling system has been proposed in which an ignition timing is controlled so as to suppress engine revolutional speed variations. For example, when the engine revolutional speed is reduced during the generation of shuddering vibrations, the ignition timing is advanced to increase the engine torque. When the engine speed is increased, the ignition timing is retarded to decrease the engine torque. Consequently, the engine speed and torque variations are suppressed.

However, the level at which the surge and shuddering vibrations are suppressed is still insufficient. That is to say, the generation of the shuddering vibration is changed according to a load state of the engine. For example, with a throttle valve widely opened, an engine torque is largely changed when the ignition timing is corrected. On the other hand, in a case of a partial load, the engine torque does not remarkably change even when the ignition timing is corrected.

Another previously proposed ignition timing controlling system has been proposed in which the ignition timing is corrected, with the load state of the engine taken into account, so as to further suppress the generation of shuddering vibrations. (Refer to a Japanese Patent Application First Publication (Non-Examined) Hei 1-125566 published on May 18, 1989).

In the other previously proposed ignition timing controlling system, a first correction coefficient is set such that the ignition timing is corrected according to the engine revolutional speed when the engine is in a transient operating state and a second correction coefficient is set such that the ignition timing is corrected on the basis of a load state of the engine, thus suppressing the engine rotational speed variations according to the load state during the engine acceleration/deceleration. Consequently, the generation of the shuddering vibrations of the vehicle is prevented.

However, the previously proposed ignition timing controlling system has drawbacks as follows:

A basic ignition timing angle is advanced when the engine revolutional speed is reduced during the generation of shuddering vibrations on a basis of a predetermined ignition timing angle map. On the other hand, when the engine revolutional speed is increased, the basic ignition timing is retarded. Therefore, when the basic ignition timing is set at an angle which exceeds a minimum angle for a best torque, so called, MBT due to an engine coolant temperature variation or aging effect on the engine, an optimum control for the shuddering vibrations cannot be achieved. in a worst case, a vibration attracting force is often impinged on the vibrations to assist the generation of the shuddering vibrations.

SUMMARY OF THE INVENTION

It is an object of the present invention to provide a system and method for controlling ignition timing for an internal combustion engine which suppresses vibrations due to engine revolutional speed variations and improve engine driveability by reversing an advance angle correction and retardation angle correction of the ignition timing before and after the MBT (Minimum Advance for Best Torque) when the vehicle runs and the engine is transferred into a transient state.

This can be achieved by providing a system for controlling ignition timing for a vehicular internal combustion engine, comprising: (a) first means for detecting engine operating conditions; (b) second means for setting a basic ignition timing on the basis of the engine operating conditions; (c) third means for determining whether the engine is transferred into a transient operating state on the basis of the engine operating conditions and for deriving an engine rotational angle (MBT) with respect to a top dead center of at least one cylinder at which pressure in a combustion chamber thereof has reached its maximum; (d) fourth means for determining whether the basic ignition timing exceeds the engine rotational angle (MBT) in an advance angle direction when the engine is transferred into the transient operating state; (e) fifth means for deriving whether the engine rotational speed is increased or decreased when the basic ignition timing exceeds the engine rotational angle (MBT), for correcting the basic ignition timing in the advance angle direction when the engine rotational speed is increased, and for correcting the basic ignition timing in a retardation angle direction when the engine rotational speed is decreased; and (f) sixth means for igniting air-fuel mixture supplied into each cylinder of the engine at a timing determined by the fifth means.

This can also be achieved by providing a method for controlling ignition timing for a vehicular internal combustion engine, comprising the steps of: (a) detecting engine operating conditions; (b) setting a basic ignition timing on the basis of the engine operating conditions; (c) determining whether the engine is transferred into a transient operating state on the basis of the engine operating conditions and deriving an engine rotational angle (MBT) with respect to a top dead center of at least one cylinder at which pressure in a combustion chamber thereof has reached its maximum; (d) determining whether the basic ignition timing exceeds the engine rotational angle (MBT) in an advance angle direction when the engine is transferred into the transient operating state; (e) deriving whether the engine rotational speed is increased or decreased when the basic ignition timing exceeds the engine rotational angle (MBT), correcting the basic ignition timing in the advance angle direction when the engine rotational speed is increased, and correcting the basic ignition timing in a retardation angle direction when the engine rotational speed is decreased; and (f) igniting air-fuel mixture supplied into each cylinder of the engine at a timing determined in the step (e).

DETAILED DESCRIPTION OF THE PREFERRED EMBODIMENT

Reference will hereinafter be made to the drawings in order to facilitate a better understanding of the present invention.

Figure 1:
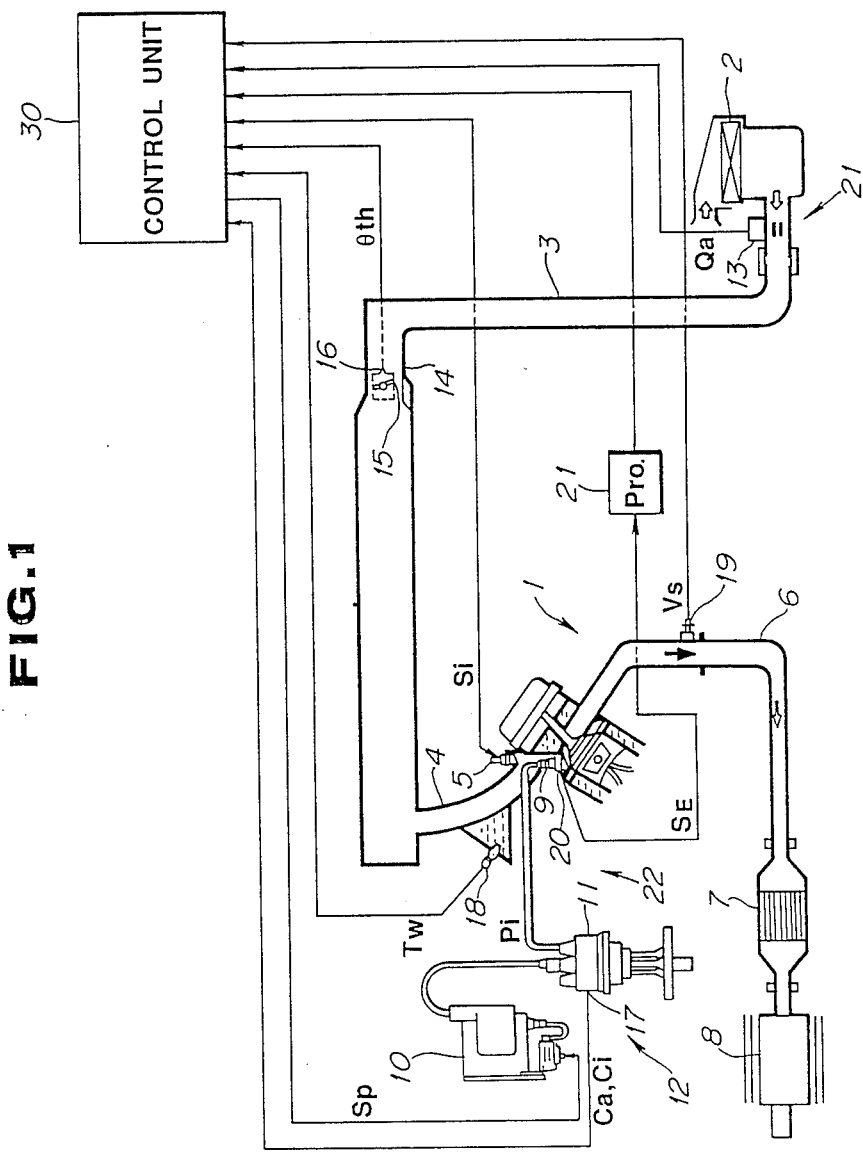
FIG. 1 is a circuit block diagram of an ignition timing controlling system in a preferred embodiment according to the present invention.

FIG. 1 shows an overall view of a preferred embodiment of an ignition timing controlling system according to the present invention.

As shown in FIG. 1, an engine 1 has each branch passage in an intake manifold 4 communicated with an intake pipe 3. An air cleaner 2 is provided via the intake pipe 3 for sucking intake air into each cylinder. A fuel is injected through a fuel injector 5 installed in each cylinder on the basis of an injection signal Si. An exhaust gas combusted in each cylinder is introduced into a catalytic converter 7 via an exhaust pipe 6. The catalytic converter 7 clarifies harmful components in the exhaust gas and exhausts them to an external via a muffler 8.

An ignition plug 9, mounted on each cylinder, receives a high voltage pulse Pi derived from an ignitor 10 via a distributer 11. The ignition plug 9, ignitor 10, and distributor 11 constitute ignition means 12 for igniting air-fuel mixture. The ignition means 12 discharges a high voltage pulse Pi on the basis of the ignition signal Sp. The air-fuel mixture sucked into each cylinder is ignited, exploded, and exhausted in response to the ignition pulse Pi.

Air flow quantity Qa is detected by means of an airflow meter 13 of a hot-wire type. A throttle valve 15 installed in a throttle chamber 14 controls the air flow quantity Qa. An opening angle $\theta_{th}$ of the throttle valve 15 is detected by means of a throttle valve opening angle sensor 16. A crank angle of the engine (engine crankshaft) is detected by means of a crank angle sensor 17 incorporated into a crank angle sensor 17. The crank angle sensor 17 outputs a reference signal Ca having a high level pulse (H) at a predetermined position, e.g., BTDC 70° (before a top dead center in a compression stroke) for each explosion interval (in a case of six-cylinder engine, 120 degrees and in a case of a four-cylinder engine, 180 degrees) and outputs a unit angle $C_1$ having a pulse (e.g., 2°). It is noted that the number of pulses of the reference signal Ca measures an engine revolutional speed N.

A water temperature sensor 18 detects a coolant temperature Tw of coolant flowing through a water jacket of the engine 1. A concentration of an oxygen $O_2$ $V_s$ in an exhaust gas is detected by means of an oxygen sensor 19. A combustion pressure (internal pressure of a cylinder) is detected by means of an in-cylinder pressure sensor 20 constituted by a piezoelectric element. The in-cylinder sensor 20 is molded as a washer of each ignition plug 9. The in-cylinder pressure sensor 20 detects the internal pressure acting upon the piezoelectric element via the ignition plug 9 and outputs an electric charge signal $S_E$ having an electric charge value corresponding to the internal cylinder pressure. The in-cylinder pressure sensor 20 is installed in each cylinder and the output $S_E$ of the in-cylinder sensor 20 is inputted into a signal processing circuit 21. The signal processing circuit 21 detects a physical quantity associated with a combustion vibration energy on the basis of an output $S_E$ of the in-cylinder pressure sensor 20.

A control unit 30 receives the sensed signals from the air flow meter 13, opening angle sensor 16, crank angle sensor 17, water temperature sensor 18, oxygen concentration sensor 20, signal processing circuit 21. The ignition signal Sp is generated from the control unit 30 which represents a result of necessary calculations executed in the control unit 20.

A basic concept of the present invention will be described with reference to FIGS. 2 and 3.

Figure 2:
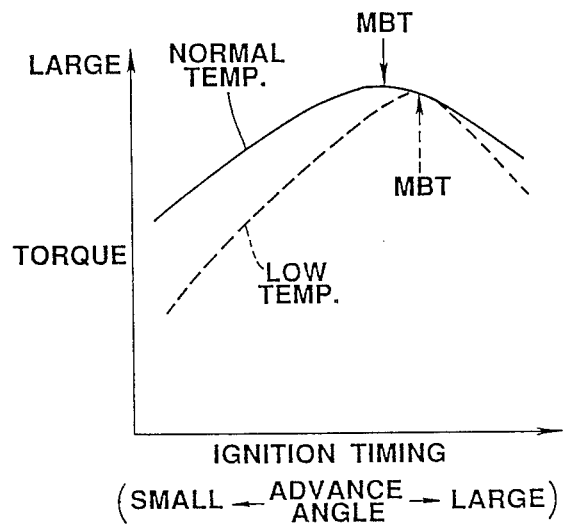
FIG. 2 is a characteristic graph of an engine torque at a time of a high load condition.

FIG. 2 shows a torque-advance curve at a high engine load.

Figure 3:
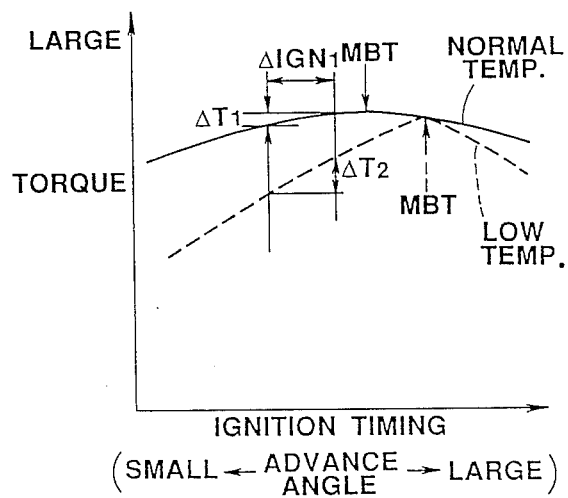
FIG. 3 is a characteristic graph of an engine torque at a time of low load condition.

FIG. 3 shows a torque-advance curve at a low engine load.

As shown in FIGS. 2 and 3, an MBT curve is convexed during the high-load state at a normal (normally operating) temperature and the MBT curve is substantially flat during the high-load state so that a torque sensibility is low with respect to the ignition advance angle. However, since a torque-advance curve at a low temperature is formed as denoted by a broken line of FIGS. 2 and 3. The torque sensibility becomes high with respect to the advance ignition angle. For example, to carry out the advance angle control during the low engine load so as to attenuate vibrations, when it is necessary to change the torque $\Delta T_1$ as shown in FIG. 3, a previously proposed ignition timing controlling system described in the Background of the art changes the advance angle quantity by $\Delta IGN_1$. That is to say, since a temperature's factor is not included in an ignition timing control procedure, the change quantity of the torque is $\Delta T_2 > \Delta T_1$. This is because $\Delta IGN$ is the same as in the case of the normally operating temperature if the vibrating condition (detected from $\Delta N/\Delta t$, $\Delta N/\Delta t$ denotes the change rate of the engine revolutional speed per time) is the same even under the low temperature. The hesitation generation and/or limitation for the harmful exhaust gas cannot be passed.

Therefore, the torque-advance map is derived with the temperature as a parameter. Furthermore, a torque control quantity is simultaneously derived to map the change quantity of the advance angle $\Delta IGN$ according to the engine load and temperature (coolant temperature) and to perform a learning control. Since the individual engines 1 have deviative characteristics, the torque-advance curve is updated during the actual run of the vehicle (at this time, the MBT control may be used). Under a certain operating condition, the torque and advance quantity are detected. At this time, the generation of the shuddering vibrations is simultaneously detected. A change quantity of the advance angle $\Delta$IGN which meets a quantity of required reduced torque is derived from the torque-advance map after the updating. An optimum control against the shuddering vibrations is always achieved regardless of the temperature.

The ignition timing of recently developed engines is usually set in the vicinity to the MBT. The value of the ignition timing is different individually according to the individual engines. The advance map is matched under the temperature condition of 80° under a central value specification now developing. Suppose that a situation at which the shuddering vibrations are generated with the throttle valve fully opened.

Figure 4:
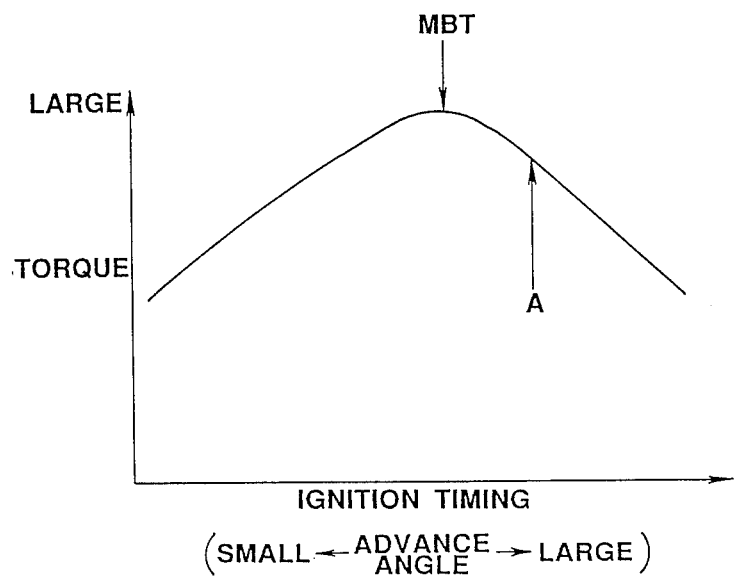
FIG. 4 is a characteristic graph of a relationship between a basic ignition timing and an MBT (Minimum advance for a Best Torque).

FIG. 4 shows a torque-advance curve in a case where the basic ignition timing exceeds MBT with a shift position of an engine power transmission placed at a second gear position and the throttle valve fully open WOT (Wide Open Throttle).

As shown in FIG. 4, the ignition timing determined when the engine coolant temperature is low due to variations in the tuning of the engine and regardless of the temperature (determined according to the engine revolutional speed and boost pressure) includes a case where the basic ignition timing is set at a crank angular position exceeding the MBT.

Under such a situation as described above, when the previously proposed ignition timing controlling system is used (When the shuddering vibrations are generated, the ignition timing is retarded during the increase in the engine revolutional speed to suppress the torque. In addition, when the engine revolutional speed is reduced, the ignition timing is advanced to increase the torque), the engine revolutional speed is increased with the ignition timing angle retarded and is decreased with the ignition timing angle advanced so that a force to assist the shuddering vibrations is generated.

Therefore, in the present invention, a difference between the present advance angle and basic ignition timing is derived, depending on a sign of the difference the reverse ignition timing control logic is adopted so that the ignition timing control is acted in a direction to always reduce vibrations.

Figure 5A:
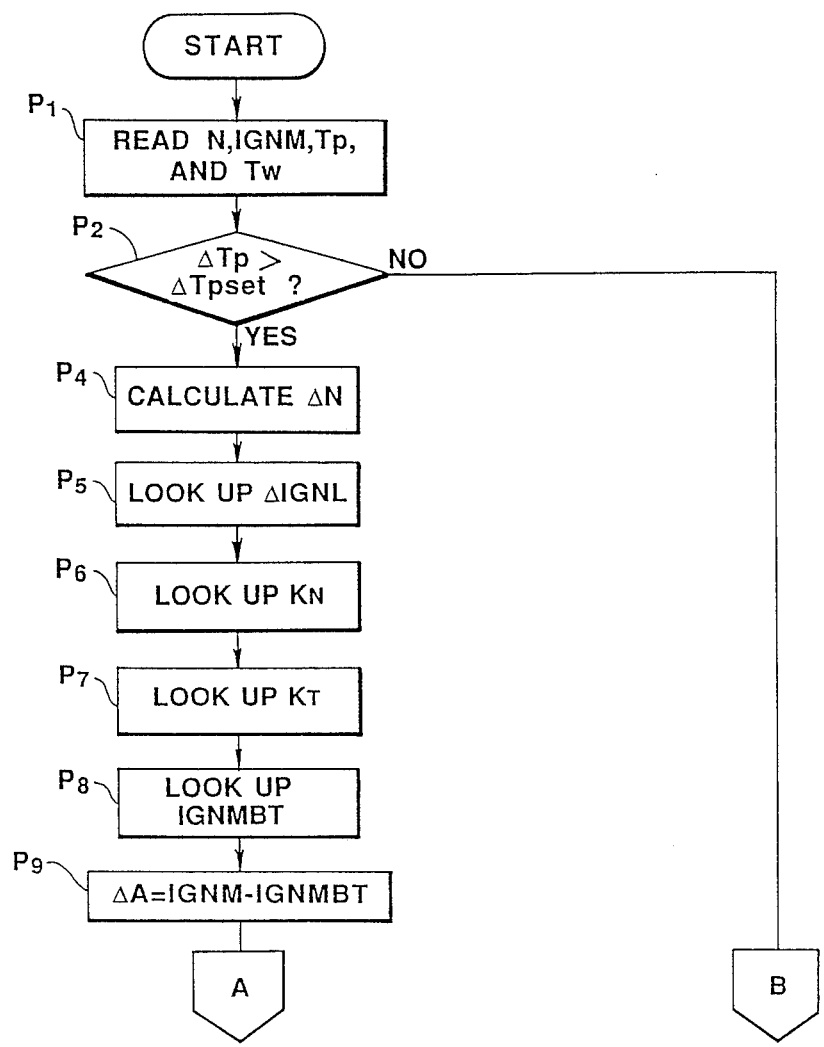
FIGS. 5 (A) and 5 (B) are integrally a program flowchart of an ignition timing control executed by a control unit shown in FIG. 1.

FIG. 5 shows a program flowchart indicating an ignition timing control routine based on the basic concept of the present invention described above.

The program flow shown in FIG. 5 is executed per predetermined time.

In a step $P_1$, the CPU (control unit 30) reads the engine revolutional speed N, basic ignition advance angle IGNM, fuel injection pulsewidth Tp, and coolant water temperature Tw. The fuel injection pulsewidth Tp is calculated from the engine revolutional speed N, and intake air quantity Qa. The basic ignition timing angle IGNM is looked up from a table map with the engine revolutional speed N and fuel injection pulsewidth Tp as parameters.

In a step $P_2$, the CPU compares a change quantity $\Delta$Tp of the fuel injection pulsewidth Tp with a predetermined value $\Delta$Tpset to determine whether the engine is accelerated (transient state). When it is not accelerated, a final ignition timing IGN is derived on the basis of the basic ignition timing IGNM in a step $P_3$.

A value based on IGN is then set into a predetermined registor in the control unit 30 and the ignition signal Sp is outputted to the ignition means 12 at a determined timing. Then, the present routine is ended.

On the other hand, when the CPU determines that the engine is accelerated in the step $P_2$, the routine goes to a step $P_4$ in which the change quantity $\Delta$N of the engine revolutional speed N is calculated. In a step $P_5$, the correction quantity $\Delta$IGNL is looked up which corresponds to the derived change quantity $\Delta$N.

In a step $P_6$, a correction coefficient $K_N$ is looked up which corresponds to the engine revolutional speed N. In a step $P_7$, the CPU looks up a correction coefficient $K_T$ which corresponds to the coolant temperature Tw. In a step $P_8$, the CPU looks up the ignition timing IGNMBT which provides the minimum advance for a best torque (MBT) angle. The method of deriving the MBT is exemplified by U.S. Pat. No. 4,660,535 issued on Feb. 28, 1987 and U.S. Pat. No. 4,774,922 issued on Oct. 4, 1988, the disclosures of which are hereby incorporated by reference.

Figure 6A:
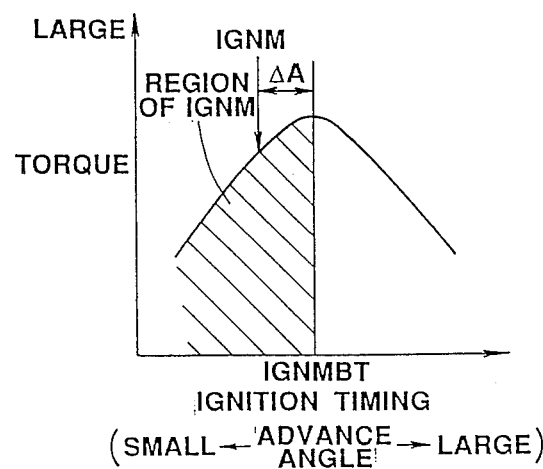
FIG. 6 (A) and 6 (B) are characteristic graphs of the engine torque with respect to the ignition timing executed in the system shown in FIG. 1.
Figure 6B:
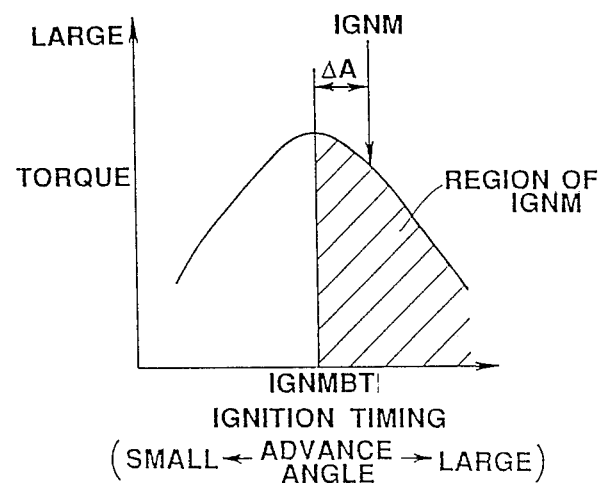

In a step $P_9$, the CPU calculates a difference $\Delta$A between the basic ignition timing IGNM and ignition timing IGNMBT at the time of the maximum torque (=IGNM - IGNMBT). Then, in a step $P_{10}$, the CPU determines a sign of A. When the sign of $\Delta$A is negative ($\Delta$A <0), the CPU determines that the basic ignition timing IGNM does not exceed the ignition timing IGNMBT, as shown in FIG. 6 (a) and the routine goes to a step $P_{11}$. When the sign of $\Delta$A indicates positive ($\Delta$A $=\geq 0$), the CPU determines that the basic ignition timing IGNM shown in FIG. 6 (b) exceeds the ignition timing at the best torque and the routine goes to a step $P_{12}$.

In the steps of $P_{11}$ and $P_{12}$, the CPU determines whether a sign of $\Delta$N indicates positive.

When $\Delta$N indicates positive, the CPU determines that the engine revolutional speed is increased. When $\Delta$N indicates negative, the CPU determines that the engine revolutional speed is decreased.

When the basic ignition timing IGNM does not exceed the ignition timing IGNMBT at the time of the best torque, the ignition timing is advanced into a region in which the engine output is increased and engine torque is increased as denoted by a hatch portion shown in FIG. 6 (a). Therefore, during the decrease in the engine revolutional speed, the basic ignition timing IGNM is advanced so as to increase the engine torque in steps of $P_{13}$ through $P_{17}$. During the increase in the engine revolutional speed, the basic ignition timing is retarded so as to reduce the engine torque in steps of $P_{18}$ through $P_{20}$.

That is to say, the correction coefficient $K_A$ is looked up which corresponds to the basic ignition timing IGNM. In a step $P_{14}$, the ignition timing correction quantity $\Delta$IGN (=f($\Delta$IGNL, $K_A$, $K_N$, $K_T$)) is looked up from a table map having the parameters of $\Delta$IGNL, $K_A$, $K_N$, and $K_T$. In the step $P_{15}$, the CPU determines whether the difference $\Delta$IGN−$\Delta$A) is equal to or less than zero. If $\Delta$IGN−$\Delta$A$\leq$0, the routine goes to a step $P_{16}$ in which the CPU calculates the final ignition timing IGN in accordance with the following equation (1).

$$IGN=IGNM+\Delta IGN \tag{1}$$

On the other hand, if $\Delta IGN - \Delta A > 0$, the CPU determines that when the ignition timing is advanced any more as shown in FIG. 6 (a), the final ignition timing IGN enters a region in which the final ignition timing IGN exceeds the ignition timing IGNMBT at the time of the best torque and the engine torque is reduced. Then, in the step $P_{17}$, $\Delta N$ is substituted into the ignition timing correction quantity $\Delta IGN$ to provide the maximum increase of the engine torque. In a step $P_{18}$, the correction coefficient $K_R$ which corresponds to the basic ignition timing correction quantity IGNM is looked up.

Then, in the step $P_{19}$, the CPU looks up the correction quantity $\Delta IGN$ from a table map having the parameters of $\Delta IGNL$, $K_R$, $K_N$, and $K_T$.

The final ignition timing IGN is calculated in accordance with the following equation (2).

$$IGN = IGNM - \Delta IGN \qquad (2).$$

On the other hand, when the basic ignition timing IGNM exceeds the ignition timing IGNMBT, the ignition timing enters in a region in which the engine output is reduced and the engine torque is reduced, as denoted by a hatched portion of FIG. 6 (b).

When the engine revolutional speed is increased, the basic ignition timing IGNM is advanced so as to reduce the engine torque in steps of $P_{21}$ through $P_{23}$.

When the engine revolutional speed is reduced, the basic ignition timing IGNM is retarded so as to increase the engine torque in steps of $P_{24}$ through $P_{27}$.

In the step $P_{21}$, the correction coefficient $K_A$ is looked up which corresponds to the basic ignition timing IGNM in the step $P_{21}$.

In the step $P_{22}$, the CPU looks up the correction quantity $\Delta IGN$ (=f ($\Delta IGNL$, $K_A$, $K_N$, $K_T$)) from a table map with $\Delta IGNL$, $K_A$, $K_N$, and $K_T$ as parameters.

In the step $P_{23}$, the CPU calculates the final ignition timing IGN in accordance with the following equation (1). In a step $P_{24}$, the CPU determines whether the difference between the correction quantity $\Delta IGN$ and $\Delta A$ is equal to or less than zero.

If $\Delta IGN - \Delta A \leq 0$, the routine goes to a step $P_{27}$ in which the final ignition timing IGN is calculated in accordance with the equation (2). If $\Delta IGN - \Delta A > 0$, the CPU determines that the engine enters a region (denoted by a hatch portion shown in FIG. 6 (a)) in which the engine torque is reduced and the final ignition timing IGN calculated in accordance with the equation (2) exceeds the ignition timing IGNMBT with the more retard correction carried out. Then, in the step $P_{28}$, $\Delta A$ is substituted into the correction quantity $\Delta IGN$ so as to provide the maximum increase in the engine torque and the routine goes to the step $P_{27}$.

The correction quantity for the ignition timing denoted by $\Delta IGN$ will be described with reference to FIGS. 2 and 3.

As shown in FIGS. 2 and 3, the sensibility of the engine torque with respect to the ignition timing when the coolant temperature is lower than the normal temperature (,e.g., 80°) is higher than that when it is higher than the normal temperature in both cases of the high and low loads. The ignition timing correction quantity $\Delta IGN$ is set on the basis of the torque-advance curve at the normal temperature.

To reduce the torque by $\Delta T_1$ as shown in FIG. 3, the ignition timing is retarded by $\Delta IGN_1$. In this case, an actual change quantity of the torque when the coolant temperature is low indicates $\Delta T_2$ ($> \Delta T_1$1). Hence, when the engine coolant temperature is low, the necessary change quantity of torque cannot be achieved when the engine coolant temperature is low.

The torque-advance curve with the temperature of the engine 1 as one parameter is previously derived and the change quantity of the torque required for the ignition timing control is also previously derived through experiments. Then, the ignition timing correction quantity $\Delta IGN$ according to the change quantity of the torque is set with the above-described factors $\Delta IGNL$, $K_N$, $K_T$, and $K_T$ set as the parameters and is stored into the memory in the control unit 30 as a learning value.

The learning value is updated whenever the engine is transferred into a transient operating state. The correction quantity for the ignition timing $\Delta IGN$ according to the change quantity of the required torque when the shuddering vibrations occur is looked up to correct the ignition timing on the basis of the looked up correction quantity. Therefore, the engine torque is changed by the required quantity so that the shuddering vibrations can be suppressed over a wide range from a low coolant temperature to a high coolant temperature.

When the engine is transferred into the transient operating state during the vehicle run, the engine torque is reduced with the basic ignition timing IGNM corrected so as to advance when the engine revolutional speed is increased and the basic ignition timing IGNM exceeds the ignition timing for the best torque IGNMBT. When the engine revolutional speed is decreased, the basic ignition timing IGNM is retarded to increase the engine torque. If the basic ignition timing IGNM does not exceed the ignition timing of IGNMBT, the engine torque is reduced with the engine revolutional speed increased and ignition timing corrected so as to be retarded. During the decrease in the engine revolutional speed, the basic ignition timing angle is advanced and the engine torque is increased. Hence, the shuddering vibrations can be suppressed.

In the preferred embodiment, with the ignition timing correction quantity IGN set on the basis of each parameter $\Delta IGNL$, $K_N$, $K_T$, and $K_A$ with the temperature of the engine taken into account, the ignition timing correction quantity $\Delta IGN$ is updated during the run of the vehicle. Therefore, an accuracy of the data map is maintained in a latest state irrespective of the aging effect of the engine and system. The ill effect of the engine tuning and characteristic deviations between the individual engines can be prevented. The suppression of shuddering vibrations can be assured over a wide range from the low coolant temperature and high coolant temperature. Consequently, the engine driveability can remarkably improved.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling ignition timing for a vehicular internal combustion engine, comprising:
    (a) first means for detecting engine operating conditions;
    (b) second means for setting a basic ignition timing on the basis of the engine operating conditions;
    (c) third means for determining whether the engine is transferred into a transient operating state on the basis of the engine operating conditions and for deriving an engine rotational angle (MBT) with respect to a top dead center of at least one cylinder at which pressure in a combustion chamber thereof has reached its maximum;

(d) fourth means for determining whether the basic ignition timing exceeds the engine rotational angle (MBT) in an advance angle direction when the engine is transferred into the transient operating state;

(e) fifth means for deriving whether the engine rotational speed is increased or decreased when the basic ignition timing exceeds the engine rotational angle (MBT), for correcting the basic ignition timing in the advance angle direction when the engine rotational speed is increased, and for correcting the basic ignition timing in a retardation angle direction when the engine rotational speed is decreased; and (f) sixth means for igniting air-fuel mixture supplied into each cylinder of the engine at a timing determined by the fifth means.

2. A system as set forth in claim 1, wherein the fifth means corrects the basic ignition timing in the retardation angle direction when the engine rotational speed is increased and corrects the basic ignition timing in the advance angle direction when the engine rotational speed is decreased when the basic ignition timing does not exceed the engine rotational angle (MBT) in the advance angle direction.

3. A system as set forth in claim 2, wherein the fifth means corrects the basic ignition timing by a correction quantity $\Delta IGN$, the correction quantity being derived at least from a first correction quantity IGNL corresponding to a change rate of the engine rotational speed $\Delta N$, a first correction coefficient $K_T$ corresponding to an engine coolant temperature, a second correction coefficient $K_N$ corresponding to the engine rotational speed N, and a third correction quantity $K_R$ corresponding to the basic ignition timing.

4. A system as set forth in claim 3, wherein the fifth means determines a final ignition timing IGN from the correction quantity as follows: $IGN = IGNM - \Delta IGN$ when a difference $\Delta A$ between the basic ignition timing and engine rotational crank angle (MBT) indicates zero or positive and when the change rate of the engine rotational speed indicates zero or positive.

5. A system as set forth in claim 2, wherein the fifth means corrects the basic ignition timing by a correction quantity $\Delta IGN$, the correction quantity being derived at least from a first correction quantity $\Delta IGNL$ corresponding to a change rate of the engine rotational speed $\Delta N$, a first correction coefficient $K_T$ corresponding to an engine coolant temperature, a second correction coefficient $K_N$ corresponding to the engine rotational speed N, and a fourth correction quantity $K_A$ corresponding to the basic ignition timing.

6. A system as set forth in claim 5, wherein the fifth means determines a final ignition timing IGN from the correction quantity as follows: $IGN = IGNM - \Delta IGN$ when a difference $\Delta A$ between the basic ignition timing and engine rotational crank angle (MBT) indicates negative and when the change rate of the engine rotational speed indicates negative.

7. A system as set forth in claim 6, wherein the fifth means determines the final ignition timing IGN with the difference $\Delta A$ set as the correction quantity IGN when a difference between the correction quantity IGN and the difference $\Delta A$ indicates positive.

8. A system as set forth in claim 7, wherein the fifth means determines the final ignition timing IGN as follows: $IGN = IGNM + \Delta IGN$, when the difference $\Delta A$ indicates zero or positive and when the change rate of the engine rotational speed indicates zero or positive.

9. A system as set forth in claim 8, wherein the fifth means determines the final ignition timing IGN as follows: $IGN = IGNM - \Delta IGN$, when the difference $\Delta A$ indicates zero or positive and when the change rate of the engine rotational speed $\Delta N$ indicates negative.

10. A system as set forth in claim 9, wherein the fifth means determines the final ignition timing IGN with the difference $\Delta A$ when the difference between the correction quantity and the difference $\Delta A$ indicates zero or positive as follows: $IGN = IGNM - \Delta IGN (\Delta A)$, when the difference $\Delta A$ indicates zero or positive but when the change rate of the engine rotational speed indicates negative.

11. A system as set forth in claim 10, wherein the third means determines that the engine is transferred into the transient operating condition by determining whether a fuel injection quantity supplied to each engine cylinder is above a predetermined value.

12. A system as set forth in claim 11, wherein the third means comprises an in-cylinder pressure sensor for detecting an internal cylinder pressure of each engine cylinder and a processing circuit for deriving a physical quantity related to a combustion vibration energy from an output signal of the in-cylinder pressure sensor.

13. A system for controlling ignition timing for a vehicular internal combustion engine, comprising:

(a) first means for detecting engine operating conditions ;

(b) second means for determining a basic ignition timing advance angle on the basis of the detected engine operating conditions;

(c) third means for deriving a torque-advance map representing a curve of an engine torque with respect to an ignition timing advance angle according to an engine load and engine temperature included in the engine operating conditions when the engine is transferred in a transient operating state detected by the first means;

(d) fourth means for deriving an MBT ignition timing advance angle at which a minimum advance for a best torque is achieved from a physical quantity related to a combustion vibration energy based on an internal cylinder pressure detected by the first means;

(e) fifth means for deriving a required change rate of the engine torque according to a change rate of the engine rotational speed;

(f) sixth means for deriving a correction quantity for the ignition timing angle from the curve derived by the third means according to the required change rate of the torque, engine load, and engine temperature;

(g) seventh means for determining a final ignition timing advance angle from the map with the correction quantity such that the final ignition timing is advanced when the change rate of the engine rotational speed indicates positive and when the basic ignition timing advance angle exceeds the MBT ignition timing advance angle in the advance angle direction and is retarded when the change rate of the engine rotational speed indicates negative and when the basic ignition timing advance angle exceeds the MBT ignition timing advance angle in the advance angle direction; and (h) eighth means for igniting air-fuel mixture supplied into each cylinder at a timing determined by the seventh means.

14. A system as set forth in claim 13, wherein the seventh means determines the final ignition timing angle such that the final ignition timing is retarded when the change rate of the engine rotational speed indicates positive and when the basic ignition timing advance angle does not exceed the MBT ignition timing advance angle in the advance angle direction and is advanced when the change rate of the engine rotational speed indicates negative and when the basic ignition timing advance angle does not exceed the MBT ignition timing advance angle in the advance angle direction.

15. A system as set forth in claim 14, wherein the map derived by the third means is updated when the vehicle actually runs and the engine is transferred into the transient operating state.

16. A system as set forth in claim 13, wherein the engine temperature is derived from an engine coolant temperature.

17. A system as set forth in claim 13, wherein the engine transient state is detected by a fuel injection quantity supplied into each cylinder.

18. A system as set forth in claim 13, wherein the first means includes an internal cylinder pressure sensor installed on each cylinder.

19. A system as set forth in claim 13, wherein the basic ignition timing advance angle is determined according to the engine rotational speed and fuel injection pulsewidth supplied to a fuel injector installed on each cylinder and derived on the basis of the engine operating conditions.

20. A method for controlling ignition timing for a vehicular internal combustion engine, comprising the steps of:

(a) detecting engine operating conditions;

(b) setting a basic ignition timing on the basis of the engine operating conditions;

(c) determining whether the engine is transferred into a transient operating state on the basis of the engine operating conditions and deriving an engine rotational angle (MBT) with respect to a top dead center of at least one cylinder at which pressure in a combustion chamber thereof has reached its maximum;

(d) determining whether the basic ignition timing exceeds the engine rotational angle (MBT) in an advance angle direction when the engine is transferred into the transient operating state;

(e) deriving whether the engine rotational speed is increased or decreased when the basic ignition timing exceeds the engine rotational angle (MBT), correcting the basic ignition timing in the advance angle direction when the engine rotational speed is increased, and correcting the basic ignition timing in a retardation angle direction when the engine rotational speed is decreased; and (f) igniting air-fuel mixture supplied into each cylinder of the engine at a timing determined in the step (e).

* * * * *